United States Patent [19]

Tanaka et al.

[11] Patent Number: 4,936,658
[45] Date of Patent: Jun. 26, 1990

[54] PROJECTION TYPE LIQUID CRYSTAL DISPLAYING DEVICE

[75] Inventors: Sakae Tanaka; Tadahiko Yamaoka; Shingo Takahashi; Tomoaki Takahashi, all of Tokyo, Japan

[73] Assignee: Seikosha Co., Ltd., Japan

[21] Appl. No.: 70,788

[22] Filed: Jul. 7, 1987

[30] Foreign Application Priority Data

Jul. 8, 1986 [JP] Japan ................... 61-159933

[51] Int. Cl.$^5$ ................. G02F 1/13; G02B 5/30; G03B 21/26
[52] U.S. Cl. ................. 350/337; 350/338; 350/347 V; 350/345; 350/352; 350/397; 350/408; 353/34; 353/37
[58] Field of Search ......... 350/337, 352, 345, 342, 350/408, 397, 385; 353/34, 37

[56] References Cited

U.S. PATENT DOCUMENTS

| | | | |
|---|---|---|---|
| 3,588,324 | 6/1971 | Marie | 350/408 |
| 4,190,832 | 2/1980 | Mohler | 350/337 |
| 4,687,301 | 8/1987 | Ledebuhr | 350/337 |
| 4,796,978 | 1/1989 | Tanaka et al. | 350/342 |

FOREIGN PATENT DOCUMENTS 60-2916  1/1985  Japan.
0097315  5/1985  Japan .................. 350/337

Primary Examiner—Stanley D. Miller
Assistant Examiner—Trong Quang Phan
Attorney, Agent, or Firm—Bruce L. Adams; Van C. Wilks

[57] ABSTRACT

A projection type liquid crystal display device includes a light source and condenser lenses for emitting two groups of beams of light which orthogonally cross each other. A first device is disposed in the path of one of the groups of beams and comprises a liquid crystal panel and at least one polarization plate to transmit P-wave polarized light. A second device is disposed in a path of the other group of beams of light and comprises a liquid crystal panel and at least one polarization plate to transmit P-wave polarized light. A dichroic mirror disposed to receive light from the first and second devices synthesizes the P-wave polarized light by transmitting P-wave polarized light from the first device and for reflecting the P-wave polarized light from the second device.

10 Claims, 5 Drawing Sheets r = light intensity
θ = angle

PROJECTION TYPE LIQUID CRYSTAL DISPLAYING DEVICE

DETAILED DESCRIPTION OF THE INVENTION

1. Technical Field of the Invention

The present invention relates to a projection type liquid crystal displaying device. '2. Description of the Related Art:

A conventional projection type liquid crystal displaying device is disclosed in the specification of Japanese Patent Publication No. 2916/1985, the arrangement being such that liquid crystal panels provided for respective colors of R, G, B, and beams of the light transmitting through each individual liquid crystal panel are synthesized by a dichroic mirror so as to be projected.

3. Object of the Invention:

In the prior art device, beams of the light of R, G, B are synthesized by employing two pieces of dichroic mirrors each making an incident angle of 45°. However, consideration is not given to the optical axis of the light which strikes on the dichroic mirror.

According to an experiment made by the present applicant, in the case of rectilinear polarization wherein TN (Twisted Nematic) type liquid crystal is utilized for a liquid crystal panel, it has been proven that ghost images are created by multiple reflections, depending on the axis of the light falling upon the dichroic mirror, and at the same time the images are of bad color purity. In the case of incidence of P-wave polarization, there is no problem. The incidence of S-wave polarized light which is in a plane which is normal to the plane of the P-wave polarized light, however, brings about the above-mentioned problems. This stems from the fact that a reflection factor of the P-wave on the surface of glass is, as shown in FIG. 7, different from that of the S-wave, and spectral property of dichroic mirror, as illustrated in FIG. 8, differs with respect to the S-wave and the P-wave.

It can be understood from FIG. 7 that there is almost no reflection of the P-wave in the vicinity of an incident angle of 45°, whereas the reflection of the S-wave can be seen. This implies that a beam of light k, reflected on the surface of a boundary between the glass and the air after being transmitted through a multi-layer thin film 26, among beams of the light having unnecessary wavelength, is large when the light of S-wave falls upon the dichroic mirror 25 in FIG. 9. The same may be said of a beam of transmitted light j. Beams of the reflected light K, k and the transmitted light j strike upon a projection lens system in such a way that they deviate laterally by only $\sqrt{2}t$ when t is defined as the thickness of the glass. Since 10~100-fold magnification is possible in the projection lens, if a mirror having an ordinary thickness of approximately 3 mm is employed, the aforementioned deviation becomes conspicuous and the ghost images are thereby projected.

Referring to FIG. 8, there is shown the spectral property of a G-reflection dichroic mirror which makes an incident angle of 45°. As is obvious from FIG. 8, a range of wavelength of the reflected light is comparatively narrow in regard to the P-wave, while on the other hand the S-wave has a relatively wide range. Videlicet, in the case of incidence of the light of the S-wave type, the light that is to be reflected ranges from G, R closely to B, and the color purity is thereby deteriorated.

Accordingly, it is a primary object of the present invention to provide a projection type liquid crystal displaying device which creates no ghost image and is capable of obtaining images with high color purity.

SUMMARY OF THE INVENTION

In a projection type liquid crystal displaying device composed by liquid crystal panels made of TN type liquid crystal, the improved projection type liquid crystal displaying device according to the present invention is characterized in that the light which falls upon the dichroic mirror involves P-wave polarized light.

DESCRIPTION OF THE PREFERRED EMBODIMENTS

Figure 1:
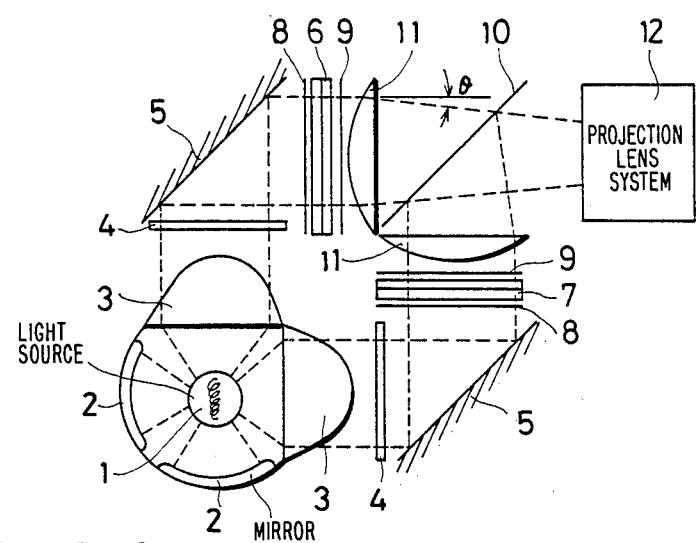
FIG. 1 is an explanatory view showing one embodiment of the present invention.
Figure 2:
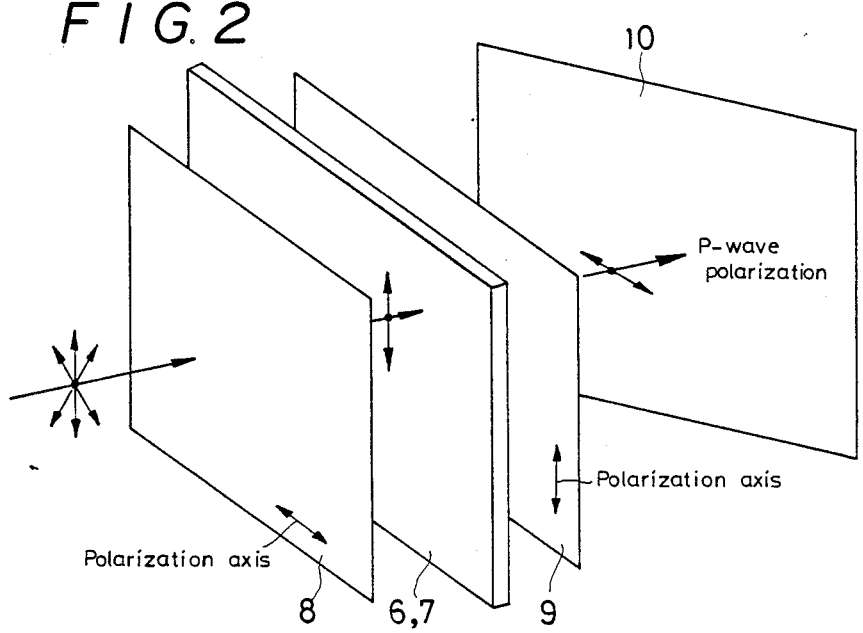
FIG. 2 is a perspective view showing a portion extracted from FIG. 1.

In FIG. 1, the numeral 1 represents a light source such as a halogen lamp or a xenon lamp; 2, 2 stand for cold mirrors; 3, 3 denote condenser lens for splitting the light coming from the light source into beams of bidirectional parallel light which are orthogonal to each other; and, 4, 4 designate heat protecting filters. The numerals 5, 5 stand for reflection mirrors; 6 represents a liquid crystal panel for R and B; and 7 denotes a liquid crystal panel for G. In this embodiment, the liquid crystal panels 6, 7 comprise positive TN type liquid crystal. Such is the arrangement that P-wave polarized light falls upon a dichroic mirror 10 by making use of two pieces of polarization plates 8, 9 which have, as illustrated in FIG. 2, polarization axes orthogonal to each other. The numerals 11, 11 represent convex lenses for converging beams of parallel light of $\theta$ ($0° \leq \theta \leq 5°$), and 12 stands for a projection lens system.

In the above-described constitution, the light emitted from the light source 1 strikes directly, or after being reflected on the cold mirrors 2, upon the condenser lenses 3, thereby becoming parallel light. Beams of the parallel light are reflected via the heat protecting filters 4 on the reflection mirrors 5 and are then led to the liquid crystal panels 6, 7. Beams of the light transmit through the polarization plate 8, the liquid crystal panel 7 and the other polarization plate 9 and beams of the light likewise transmit through the polarization plate 8, the liquid crystal panel 6 and the polarization plate 9. The transmitted light is converged by only $\theta$ by the use of the convex lenses 11 and is the led to the dichroic mirror 10 as P-wave polarized light. It is thus feasible to diminish both an aperture of the projection lens system and an aberration.

If θ is more than 5°, however, color shading is apt to appear on the picture, which causes a decline in the quality of the picture.

Figure 9:
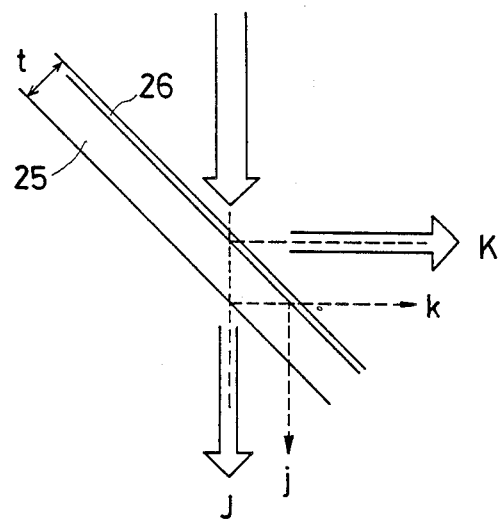
FIG. 9 is an explanatory view showing the light reflected on the dichroic mirror.

The dichroic mirror 10 employed herein is of a G-reflection type wherein the light of G that the liquid crystal panel 7 admits is reflected, whereas beams of the light of R and B each passing through the liquid crystal panel 6 are further transmitted so as to be synthesized and are then projected by the projection lens system 12. The P-wave polarized light strikes upon the dichroic mirror 10 and hence there is almost no reflection of the light having unnecessary wavelengths. Furthermore, beams of the reflected light j and k shown in FIG. 9 substantially disappear. As a result, no ghost image is present on the screen, and no reflection of the light with unnecessary wavelengths is made at all, thereby obtaining images having favorable color purity.

The light source 1 has heat and air-cooling is therefore required. According to the constitution in this embodiment, highly efficient cooling is possible by virtue of ventilation made by actuating a fan on the front side or on the rear side of the Figure.

Figure 3:
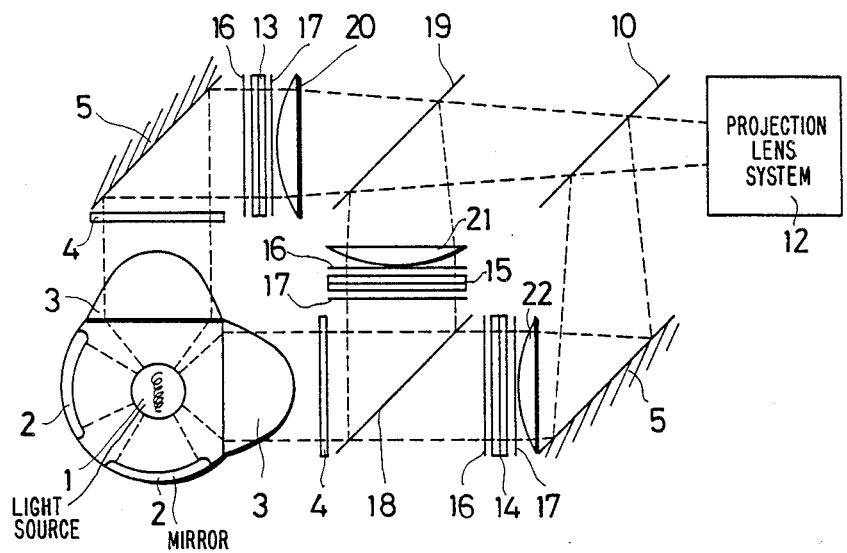
FIG. 3 is an explanatory view showing another embodiment of the present invention.

FIG. 3 shows another embodiment wherein three pieces of liquid panels 13, 14, 15 are used corresponding to R, G, B. In the Figure, the numerals 16, 17 denote polarization plates having polarization axes which are orthogonal to each other; 18, 19 designate B-reflection dichroic mirrors ; and 20 to 22 stand for convex lenses for converging beams of parallel light at a angle of 5° or less.

In this configuration, P-wave polarized light is arranged to strike upon the dichroic mirrors 10 and 19. The light of R which passes through the liquid crystal panel 13 is converged by the convex lens 20 and then transmits through to the dichroic mirrors 19, 10.

On the other hand, the light of B which is reflected on the dichroic mirror 18 passes through the liquid crystal panel 15 and is then converged by the convex lens 21. Thereafter, the thus converged light is reflected on the dichroic mirror 19 and transmits the dichroic mirror 10.

The light transmitting the dichroic mirror 18 enters the liquid crystal panel 14 and is converged by the convex lens 22. In the wake of this step, the thus converged light is reflected on the reflection mirror 5 and further undergoes reflection on the dichroic mirror 10.

In this way, beams of the light which transmit through to each individual liquid crystal panel are synthesized and are led to the projection lens system 12, in which place they are projected.

In this embodiment, too, since the dichroic mirrors 10, 19 undergo the incidence of the P-wave polarized light, it is feasible, as in the case of the previous embodiment, to eliminate the ghost images and to obtain images having high color purity.

In the embodiment of FIG. 3, when using a halogen lamp as a light source, the direction in which the lamp is placed is adjusted so as to correspond to the property of light distribution. To be specific, the placement is, as illustrated in the Figure, made so that the wiring of a filament of the lamp is directed to the liquid crystal panel 13 of R. The reason why this is as follows.

Figure 4:
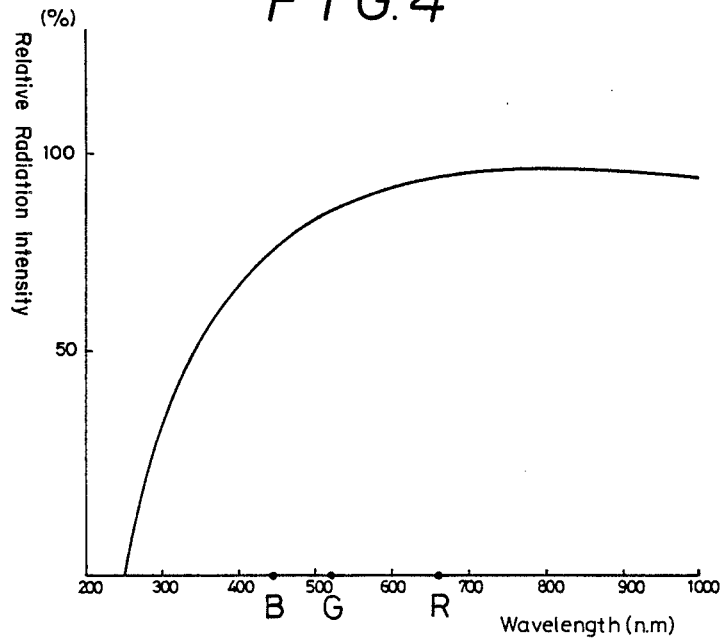
FIG. 4 is a characteristic diagram showing radiation spectral distribution of a halogen lamp.

A radiation spectral distribution of the halogen lamp exhibits, as shown in FIG. 4, the highest intensity in R among R, G and B.

Figure 5:
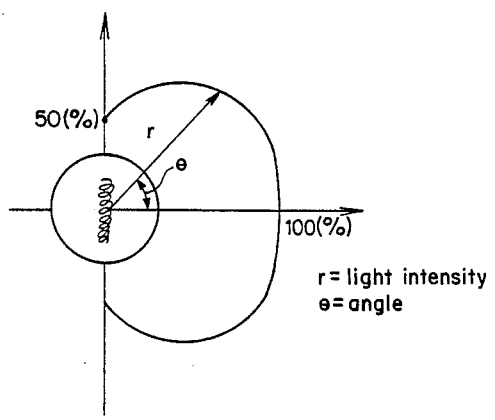
FIG. 5 is a characteristic diagram showing property of light distribution of the halogen lamp.

On the other hand, it can be observed from FIG. 5 that the light intensity is lowered in the wiring direction of the filament of the halogen lamp.

In order to equalize the light intensities of R, G and B, the filament is disposed so as to direct its wiring to the liquid crystal panel with the result that the light intensity on the side of R is lower than those on the sides of G and B.

Figure 6:
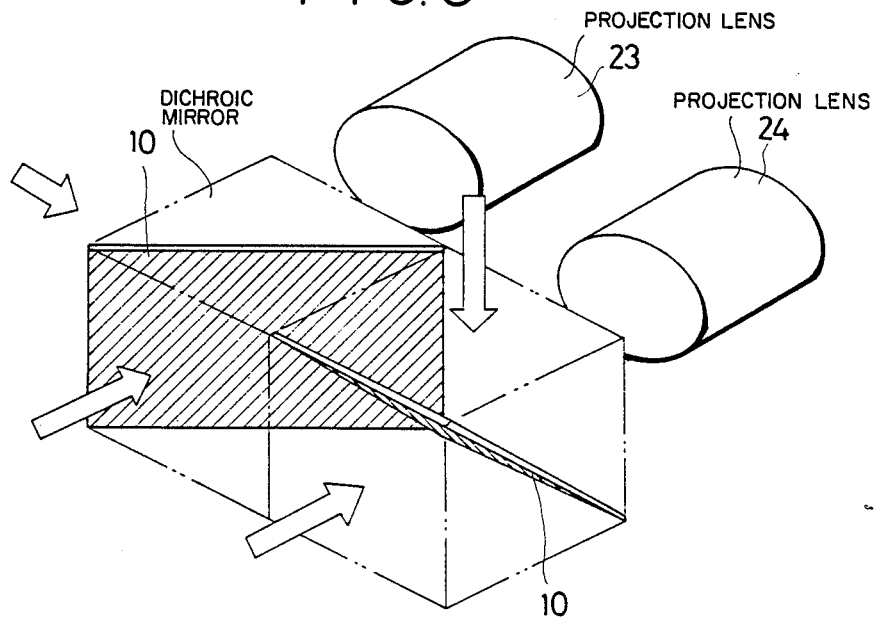
FIG. 6 is an explanatory view showing projection lenses and dichroic mirrors disposed in front of these lenses when constituting a displaying device designed for stereoimages.
Figure 7:
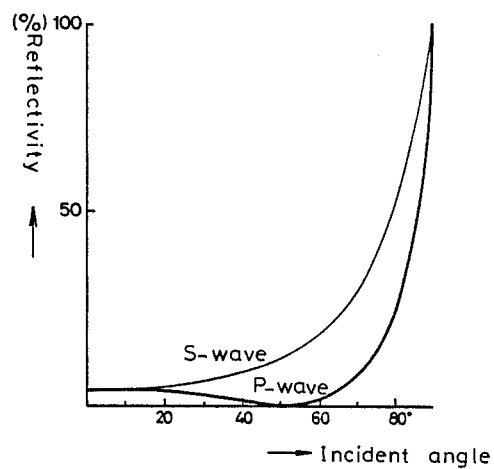
FIG. 7 is a characteristic diagram showing reflectivity on the surface of glass.
Figure 8:
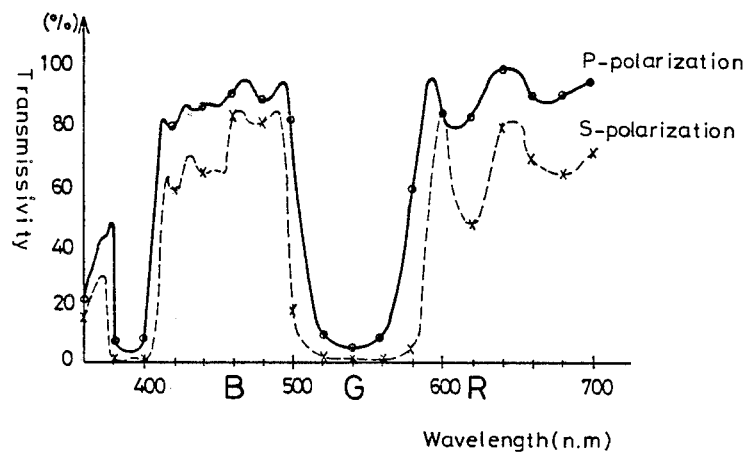
FIG. 8 is a characteristic diagram showing spectral property of a G-reflection dichroic mirror.

On the occasion of constituting the displaying device designed for stereoimages by making use of two units of the devices shown in FIG. 1 or FIG. 3, the arrangement may be such that the G-reflection dichroic mirrors 10 are, as illustrated in FIG. 6, placed in front of the projection lenses 23, 24. The light striking on the dichroic mirrors is, however, limited to the P-wave alone.

The present invention is not confined to the above-described embodiments but may be applied to all the projection type displaying devices which invariably use the TN type liquid crystal panel and the dichroic mirror.

The polarization plates are not necessarily disposed in the front and in the rear of the liquid crystal panel but may be placed on the side of the projection lens or in front of the screen. Even such placement yields the same effects. The arrangement, however, has to be made so that only the P-wave polarized light which passes through the dichroic mirror can be projected.

In the aforementioned embodiments, the positive TN type liquid crystal panel is employed. However, a negative TN type liquid crystal panel having two pieces of polarization plates whose polarization axes are parallel with each other may also be used.

The present invention yields the following effects. When beams of the light which transmit a plurality of the TN type liquid crystal panels are synthesized by the dichroic mirror, only the P-wave polarized light falls upon the dichroic mirror, and it is therefore possible to obtain the images having high color purity without producing the ghost images.

What we claim is:

1. A projection type liquid crystal display device comprising:
   light emitting means for emitting two groups of beams of light which are orthogonal and cross each other at an area of intersection;
   first means disposed in the path of one of the groups of beams of light between the light emitting means and the area of intersection and comprising a liquid crystal panel and at least one polarization plate to transmit P-wave polarized light;
   second means disposed in the path of the other of the groups of beams of light between the light emitting means and the area of intersection and comprising a liquid crystal panel and at least one polarization plate to transmit P-wave polarized light; and
   a dichroic mirror disposed at the area of intersection to receive P-wave polarized light from the first and second means for synthesizing the P-wave polarized light received therefrom, the dichroic mirror including means for transmitting P-wave polarized light from the first means and for reflecting P-wave polarized light from the second means.

2. A device according to claim 1; wherein the dichroic mirror includes means for reflecting green light and transmitting red and blue light.

3. A projection type liquid crystal display device comprising:

light emitting means for emitting two groups of beams of light which are orthogonal and cross each other at an area of intersection;

first means disposed in the path of one of the groups of beams of light between the light emitting means and the area of intersection and comprising a liquid crystal panel and at least one polarization plate to transmit P-wave polarized light;

second means disposed in the path of the other of the groups of beams of light between the light emitting means and the area of intersection and comprising a liquid crystal panel and at least one polarization plate to transmit P-wave polarized light;

a dichroic mirror disposed at the area of intersection to receive P-wave polarized light from the first and second means for synthesizing the P-wave polarized light received therefrom, the dichroic mirror including means for transmitting P-wave polarized light from the first means and for reflecting P-wave polarized light from the second means; and lenses for converting the groups of beams onto the dichroic mirror by an angle in the range of 0° to 5°.

4. A device according to claim 3; wherein the dichroic mirror includes means for reflecting green light and transmitting red and blue light.

5. A projection type liquid crystal display device comprising:

light emitting means for emitting two groups of beams of light having red, green and blue components;

means for directing the groups of beams of light to intersect orthogonally in a given area;

a dichroic mirror disposed in the given area and receptive of the directed groups of beams of light for transmitting at least one of the light components and reflecting another of the light components to combine the same into one combined group of beams;

first means disposed in the path of one of the groups for transmitting P-wave polarized light of at least one of the components to the dichroic mirror;

second means disposed in the path of the other of the groups for transmitting P-wave polarized light of another of the components to the dichroic mirror; and means receptive of the combined group of beams for projecting the same.

6. A device according to claim 5; wherein the dichroic mirror includes means for reflecting green light and transmitting red and blue light.

7. A device according to claim 5; wherein the second means comprises means for splitting the other of the groups into a third group orthogonal thereto, and means for combining the third group with said one of the groups; the first means includes a first polarization plate and a first liquid crystal panel for transmitting light corresponding to one color component; and the second means includes a second polarization plate and a second liquid crystal panel disposed in the path of said other group downstream of the splitting means for transmitting light corresponding to a second color component, and a third liquid crystal panel disposed in the path of the third group for transmitting light corresponding to a third color component.

8. A projection type liquid crystal display device comprising:

light emitting means for emitting two groups of beams of light having red, green and blue components;

means for directing the groups of beams of light to intersect orthogonally in a given area;

a dichroic mirror disposed in the given area and receptive of the directed groups of beams of light for transmitting at least one of the light components and reflecting another of the light components to combine the same into one combined group of beams;

first means disposed in the path of one of the groups for transmitting P-wave polarized light of at least one of the components to the dichroic mirror;

second means disposed in the path of the other of the groups for transmitting P-wave polarized light of another of the components to the dichroic mirror;

means receptive of the combined group of beams for projecting the same; and lenses for coverging the groups of beams onto the dichroic mirror by an angle in the range of 0° to 5°.

9. A device according to claim 8; wherein the dichroic mirror includes means for reflecting green light and transmitting red and blue light.

10. A device according to claim 8; wherein the second means comprises means for splitting the other of the groups into a third group orthogonal thereto, and means for combining the third group with said one of the groups; the first means includes a first polarization plate and a first liquid crystal panel for transmitting light corresponding to one color component; and the second means includes a second polarization plate and a second liquid crystal panel disposed in the path of said other group downstream of the splitting means for transmitting light corresponding to a second color component, and a third liquid crystal panel disposed in the path of the third group for transmitting light corresponding to a third color component.

* * * * *